United States Patent [19]

Hamada et al.

[11] 3,951,646

[45] Apr. 20, 1976

[54] PROCESS TO MAKE BRITTLE BOILER DUST ADHERING TO THE WATER TUBE SURFACE OF A WASTE HEAT BOILER OF NON-FERROUS METAL SMELTING FURNACE

[75] Inventors: Kunitomo Hamada, Kosaka; Kiyoshi Sato, Funabashi, both of Japan

[73] Assignee: Dowa Mining Co., Ltd., Tokyo, Japan

[22] Filed: Oct. 16, 1974

[21] Appl. No.: 515,113

[30] Foreign Application Priority Data

Dec. 25, 1973  Japan............................... 48-143740
Aug. 23, 1974  Japan................................ 49-96211

[52] U.S. Cl............................................. 75/74; 75/25; 423/210; 423/244
[51] Int. Cl.²................................................ C22B 15/02

[58] Field of Search..................... 75/25, 74, 72, 73; 423/210, 244

[56] References Cited
UNITED STATES PATENTS

| | | | |
|---|---|---|---|
| 2,784,076 | 3/1957 | Greenawalt | 75/74 |
| 3,411,864 | 11/1968 | Pallinger | 75/25 |
| 3,554,515 | 1/1971 | Torooka et al. | 75/74 |
| 3,775,094 | 11/1973 | McKie | 75/74 |

*Primary Examiner*—M. J. Andrews
*Attorney, Agent, or Firm*—Sughrue, Rothwell, Mion, Zinn & Macpeak

[57] ABSTRACT

The invention of this application relates to a process for making brittle boiler dust adhering to the water tube surface of a waste heat boiler of a non-ferrous metal smelting furnace by addition to the dust one kind of fine-powder or mixed fine-powder selected from compounds of magnesium, calcium, barium and aluminum.

6 Claims, 1 Drawing Figure

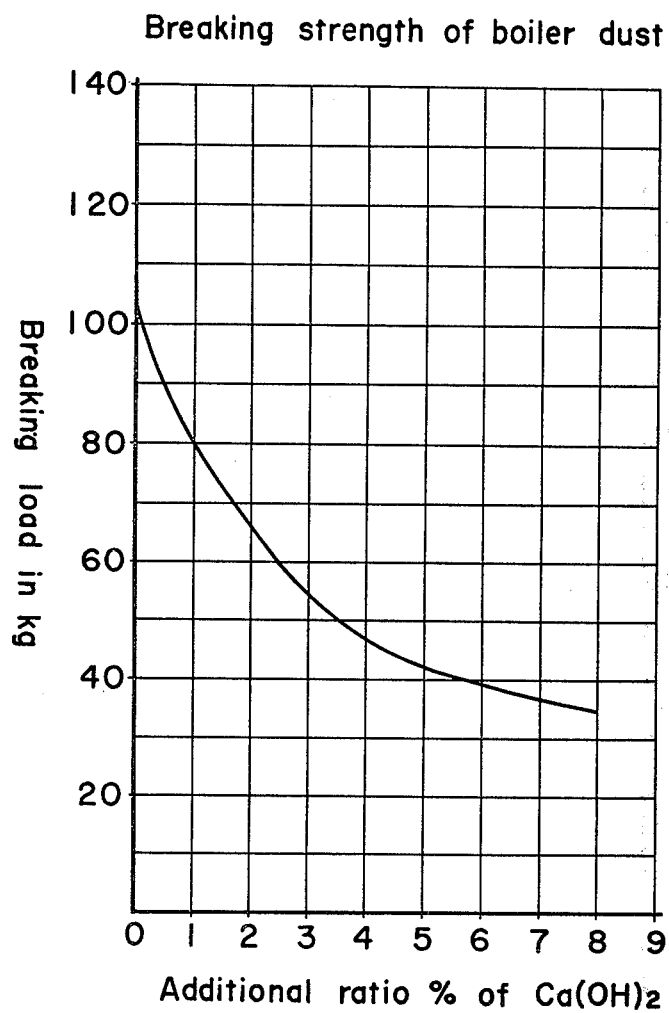

PROCESS TO MAKE BRITTLE BOILER DUST ADHERING TO THE WATER TUBE SURFACE OF A WASTE HEAT BOILER OF NON-FERROUS METAL SMELTING FURNACE

BACKGROUND OF THE INVENTION

In general, dust adhering to the inside wall of a waste heat boiler of a non-ferrous metal smelting furnace has an adhesive property and the operation rate of the waste heat boiler is therefore decreased by spent time in removing the dust accretion from the boiler by hand lancing.

In order to remove the dust adhering to the water tube surface of the above described boiler, such apparatuses as soot blowers, hammering devices, or recirculation systems for waste gas have been used. But these apparatuses have not been sufficiently satisfactory in removing the dust accretion depending on the boiler construction or condition of concentrates to be treated.

SUMMARY OF THE INVENTION

The invention of this application relates to a process for making brittle boiler dust adhering to the water tube surface of a waste heat boiler of a non-ferrous metal smelting furnace in which one kind of fine-powder or mixed fine powder (about 1–10$\mu$) selected from compounds of magnesium, calcium, barium and aluminum is dispersed and added together with compressed air to the mechanically flying dust when the dust is in molten state or semi-molten state at the entrance of or before the entrance of the boiler to make the dust less adhesive and make higher the operation rate using the above-described apparatuses by effectively removing the dust accretion.

Metallic oxides and silicates in the dust which is evaporated or mechanically produced in a non-ferrous metal smelting furnace form many kinds of silicates ($Pbo—FeO—SiO_2$ system etc.) having a low melting point, and these silicates help the dust to grow on the surface of a water tube by connecting other substances to each other. In order to prevent to growth of these dust accretions, in the invention of this application the above-described added powder having a larger affinity to the silicate than that of the metallic oxide in dust is added at the entrance of the boiler or before the entrance of the boiler to produce another silicate having a high melting point and thereby to prevent the production of a low-melting point silicate.

BRIEF DESCRIPTION OF THE DRAWING

The present invention is directed to a method for decreasing the amount of the dust accretion by adding one kind of powder or mixed powder selected from compounds of magnesium, calcium, barium and aluminum to the dust at the entrance or front part of the boiler and further increase the operation rate by running the above-described apparatuses effectively. The drawing shows the relationship between the amount of Ca(OH)$_2$ powder added and the breaking load of boiler dust according to the present invention.

DETAILED DESCRIPTION OF THE PREFERRED EMBODIMENT

Example 1

According to the present invention, the dust accretion which has been formed in a waste heat boiler of copper flash-smelting furnace was collected, crushed and mixed with Ca(OH)$_2$ by weight of 0–8%. The mixed powder was heated at 1000°C for 1 hour and crushed again. The heated and crushed powder was formed into pellet with a 14 mm diameter and a 10 mm height, and the pellet was then heated again at 1000°C for 1 hour to make a test piece. A conical wedge with a vertical angle of 45° was placed on the center of the test piece surface and the breaking strength was measured, as is shown in FIGURE. The breaking strength was decreased by an increase in the added amount of Ca(OH)$_2$.

Example 2

According to the present invention, Ca(OH)$_2$ and CaCO$_3$ were added by weight of 4–8% to the dust at the up-take part of the flash-smelting furnace.

The dust accretion in the radiation section of the waste heat-boiler became porous and brittle according to the following reaction;

$$Ca(OH)_2 \rightarrow CAO + H_2O \tag{1}$$

$$CaCO_3 \rightarrow CaO + CO_2 \tag{2}$$

$$nCaO + SiO_2 \rightarrow nCaO.SiO_2 \tag{3}$$

Fine cracks which were caused by the heat variation due to the intermittent addition of the reagent were observed on the dust accretion. The soots blower was then used efficiently and much more amount of dust could be removed by hand lancing.

What is claimed is:

1. In a copper smelting process wherein a hot flue gas conveying flue dust is generated and subsequently cooled and wherein said flue gas is conducted to a waste heat boiler wherein said flue gas contacts water tubes upon which said flue dust has a tendency to adhere, the improvement comprising in combination therewith adding to said flue gas containing flue dust in said waste heat boiler a composition selected from the group consisting of calcium oxide, calcium hydroxide and calcium carbonate thereby embrittling said flue dust and decreasing the tendency of said flue dust to adhere to said water tubes.

2. In a process according to claim 1, wherein said composition is in the form of a fine-powder or mixture of fine powders.

3. In a process according to claim 2, wherein said fine-powder or mixture of fine-powders is added to said flue dust as a dispersion in compressed air.

4. In a process according to claim 1, wherein said composition is in the form of a fine-powder or mixture of fine-powders, and wherein said fine powder of mixture of fine powders is added to said flue dust as a dispersion in compressed air.

5. In a process according to claim 1, wherein said composition is in the form of a fine-powder or mixture of fine-powders, and wherein said composition is added to said flue dust in an amount of up to 8% by weight of said dust.

6. In a process according to claim 1, wherein said composition is added to said flue dust when said flue dust is in a molten or semi-moltent state.

* * * * *